US012677718B2

(12) United States Patent
Booysen

(10) Patent No.: US 12,677,718 B2
(45) Date of Patent: Jul. 14, 2026

(54) CULTIVATING APPARATUS

(71) Applicant: Rovic and Leers (Pty) Ltd, Cape Town (CA)

(72) Inventor: Bernie Booysen, Cape Town (CA)

(73) Assignee: Rovic and Leers (Pty) Ltd, Cape Town (ZA)

( * ) Notice: Subject to any disclaimer, the term of this patent is extended or adjusted under 35 U.S.C. 154(b) by 368 days.

(21) Appl. No.: 18/238,380

(22) Filed: Aug. 25, 2023

(65) Prior Publication Data

US 2024/0065127 A1     Feb. 29, 2024

(30) Foreign Application Priority Data

Aug. 26, 2022    (ZA) ................................. 2022/09543

(51) Int. Cl.
*A01B 49/02*        (2006.01)
*A01C 5/06*         (2006.01)
(52) U.S. Cl.
CPC .............. *A01B 49/02* (2013.01); *A01C 5/062* (2013.01)

(58) Field of Classification Search
CPC ......... A01B 49/02; A01B 49/00; A01C 5/062; A01C 6/02; A01C 5/00
See application file for complete search history.

(56) References Cited

FOREIGN PATENT DOCUMENTS

EA          202392138     *   2/2024   ............. A01B 13/14
ZA          2007/05240        7/2008

* cited by examiner

*Primary Examiner* — Christopher J. Novosad
(74) *Attorney, Agent, or Firm* — Knobbe, Martens, Olson & Bear, LLP

(57) ABSTRACT

A cultivating apparatus may include a tine that extends from a leading support frame, the tine arranged to cut and loosen soil. A trailing support frame may have one or more soil working tools extending therefrom. A biasing assembly may include at least a first limb which pivotally couples the trailing support frame to the leading support frame of the tine, and a biasing spring that urges the trailing support frame and its soil working tools downward by a biasing force. The first limb may include a plurality of hooks whereto the biasing spring may be connectable. The hooks may be arranged for adjusting the biasing force of the biasing assembly.

18 Claims, 6 Drawing Sheets

10

A

30

17

34        12        32

DETAIL A

DETAIL B

DETAIL C

CULTIVATING APPARATUS

CROSS-REFERENCE TO RELATED APPLICATION

This application claims priority from South African provisional patent application number 2022/09543 filed on 26 Aug. 2022, which is incorporated by reference herein.

FIELD OF THE PRESENT DISCLOSURE

The present disclosure relates to agriculture. More particularly, but not exclusively, the present disclosure relates to an agricultural or cultivating apparatus for tilling soil and planting seeds.

BACKGROUND

Agricultural implements for tilling or ploughing have been known since ancient times. More recently, planting and seeding apparatuses have become mechanised and these apparatuses are generally drawn by tractor to work the earth. Modern planters are fairly complex and often perform both tillage and depositing seeds in furrows created by a tine and/or coulter of the planter. Some apparatuses are also configured to deposit fertiliser while planting.

Notwithstanding these recent developments, there are a number of drawbacks to known planting apparatuses. Material such as plant residue, mud, clay, soil and rocks often interfere with the planting process, and they can inhibit the accurate placement of seeds. This is especially the case when the material becomes stuck to, or cause blockage of some of the components of the planting apparatus. This may lead to inefficiencies, and seeds may not be planted at a desired depth. Interference of stuck material may also cause the furrows created to be too large, too small, or they may not have a desired cross section or shape.

In some cases, the stuck or blocking material may interfere with the planting process so much that tilled soil may be deposited into furrows of adjacent tines. This can cause problems when planting seeds as they may not be deposited at the correct depth for proper germination. In other words, after a seed is planted, soil is sometimes thrown over the seed from adjacent tines. This results in the seed being buried too deep in the soil.

Known machinery and attachments therefore have difficulty in penetrating soil deeply whilst at the same time maintaining accurate placement of seed and fertiliser. In soil having a high clay content, the soil sometimes fails to fall closed behind the tine or coulter. This results in the seeds lying in an open furrow and this can lead to poor germination.

Another problem with known machinery is that adjustment of the tilling depth of the tines or coulters may be difficult and cumbersome. Adjustment of roller wheels or compacting wheels of known planting and seeding apparatuses may also be difficult or cumbersome or impossible to perform in the field.

The applicant considers there to be room for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY

In accordance with an aspect of the present disclosure there is provided a cultivating apparatus comprising:

a tine that extends from a leading support frame, the tine arranged to cut and loosen soil;

a trailing support frame having one or more soil working tools extending therefrom;

a biasing assembly that includes at least a first limb which pivotally couples the trailing support frame to the leading support frame of the tine, and a biasing spring that urges the trailing support frame and its soil working tools downward by a biasing force, the first limb including a plurality of hooks whereto the biasing spring is connectable, the hooks arranged for adjusting the biasing force of the biasing assembly.

The hooks may be shaped as adjustment notches provided at an upper peripheral edge of the first limb.

The biasing assembly may include a second limb, the first and second limbs collectively arranged to pivotally couple the trailing support frame to the leading support frame of the tine. The first and second limbs may operatively form a quadrilateral mechanism, preferably a biased quadrilateral mechanism such as a biased parallelogram mechanism arranged to urge the trailing support frame and its soil working tools downward.

The biasing spring of the biasing assembly may extend from the first limb to the second limb. Alternatively, the biasing spring may extend from the first limb to the leading support frame, or it may extend from the first limb to the trailing support frame.

An upper end of the biasing spring may be attached, hooked or connected to one of the plurality of hooks or adjustment notches. A lower end of the biasing spring may be attached, hooked or connected to the second limb of the biasing assembly. The biasing spring may be operatively adjustable from one of the hooks or adjustment notches to another one of the hooks or adjustment notches of the first limb, e.g., at an upper periphery of the biasing assembly, so as to adjust the biasing force acting on the trailing support frame and its soil working tools.

The one or more soil working tools may include a first scraper that extends from the trailing support frame. The first scraper may be arranged to form a first bed in soil loosened by the tine.

The one or more soil working tools may include a second scraper extending from the trailing support frame. The first scraper may be laterally offset on one operative side of the tine. The second scraper may be laterally offset on an opposite operative side of the tine. The second scraper may be arranged to form a second bed in soil loosened by the tine.

The one or more soil working tools may include a wheel or roller mounted to the trailing support frame. The wheel may be arranged so as to follow the first and/or second scrapers in use. The wheel may be configured to act as a depth control wheel to control a working depth of the first and/or second scrapers of the cultivating apparatus in use.

The trailing support frame may support a first seeding tube and a second seeding tube. The first seeding tube may extend alongside the first scraper, and the second seeding tube may extend alongside the second scraper. The first seeding tube may have a first outlet opening, and the second seeding tube may have a second outlet opening. The first and second outlet openings may be arranged so as to deposit seeds therethrough in use, into the first and second beds formed by the first and second scrapers respectively.

The biasing assembly may be configured to urge the wheel and/or the one or more scrapers downward by way of the biasing force.

The biasing spring may be a tension spring. Optionally, the biasing assembly may include a plurality of biasing springs or tension springs.

In accordance with another aspect of the present disclosure there is provided a trailing support frame for a cultivating apparatus, the trailing support frame comprising:

a first component having one or more soil working tools extending therefrom;

a second component pivotally coupled to the first component, the second component having a depth control wheel mounted thereto which is arranged to control an operating depth of the one or more soil working tools; and an adjustable lock arranged to operatively adjust an angle between the first and second components and to lock the components so as to set the operating depth of the soil working tools.

The lock may include one or more teeth that are arranged to operatively adjust the angle between the first component and the second component so as to control the operating depth.

The lock may be a rack that has one or more teeth forming part of or fixed to the first component of the trailing support frame. The lock may include a biased peg or spring-operated selector mounted to the second component of the trailing support frame. The biased peg or spring-operated selector may be locked in place by a biasing spring such as a compression spring to a selected position in the rack, such as between one or more of the teeth of the rack, e.g., so as to provide a selected angle between the first and second components.

The rack and peg or selector may also be reversed in position. In other words, the rack may be provided at the second component, whereas the peg or selector may be provided at the first component.

In accordance with another aspect of the present disclosure there is provided a component for a cultivating apparatus, the component comprising:

a body having a plurality of pivotal attachment points for attaching the body to a depth control wheel component as well as to a leading support frame, the body having a first scraper and a second scraper extending therefrom and the body forming an arch shaped structure between the first and second scrapers.

The body may have a leading edge, and it may be substantially flat when viewed from a lateral side thereof.

The arch shaped structure may be rounded or angled so as to form a recess or cavity between the first and second scrapers.

The arch shaped structure may be shaped and/or configured to inhibit soil, rocks, plant residue or other material from becoming lodged or stuck between the first and second scrapers.

Embodiments of the invention will now be described, by way of example only, with reference to the accompanying drawings.

DETAILED DESCRIPTION WITH REFERENCE TO THE DRAWINGS

Figure 1:
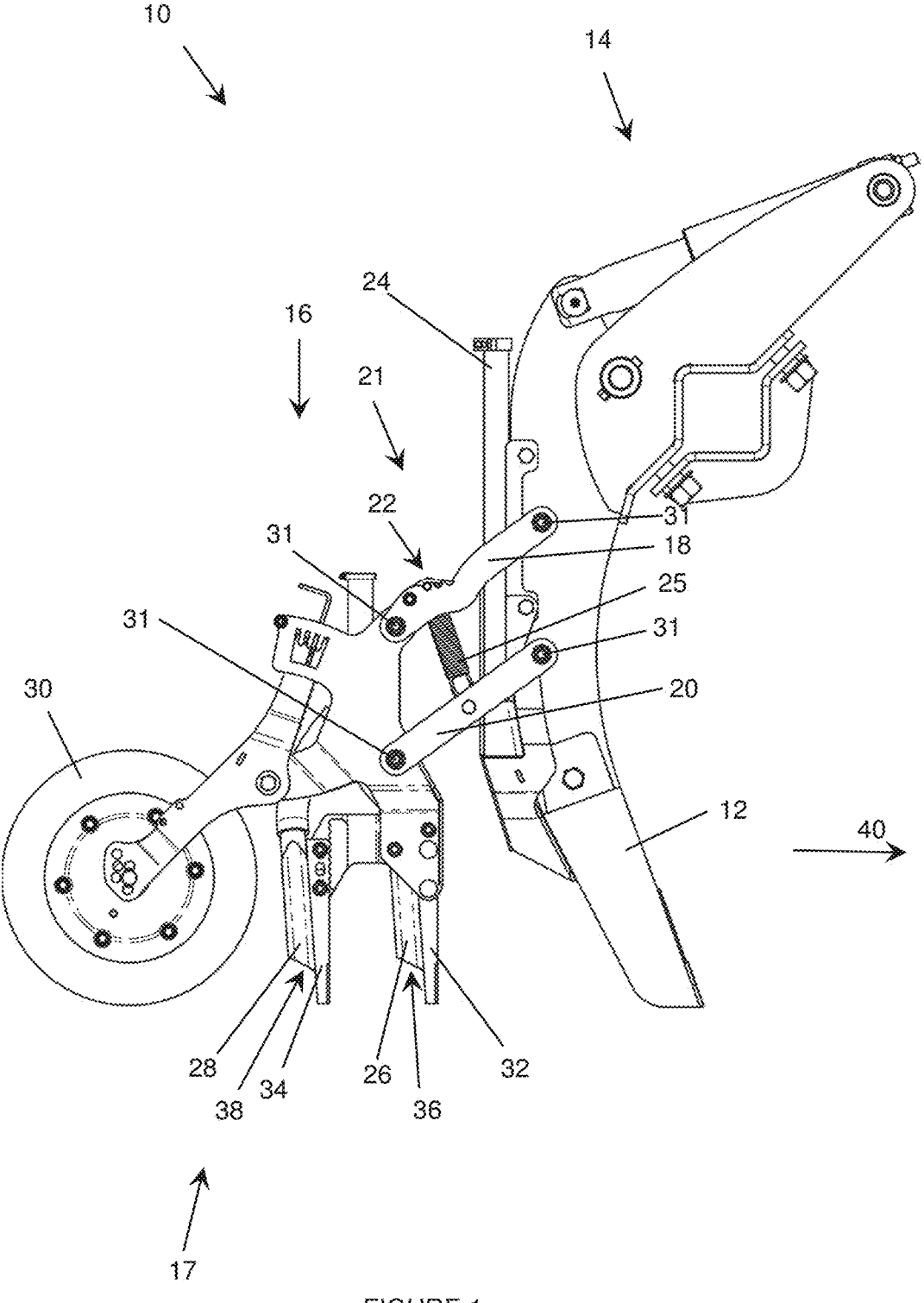
FIG. 1 is a side view of an exemplary embodiment of a cultivating apparatus.
Figure 2:
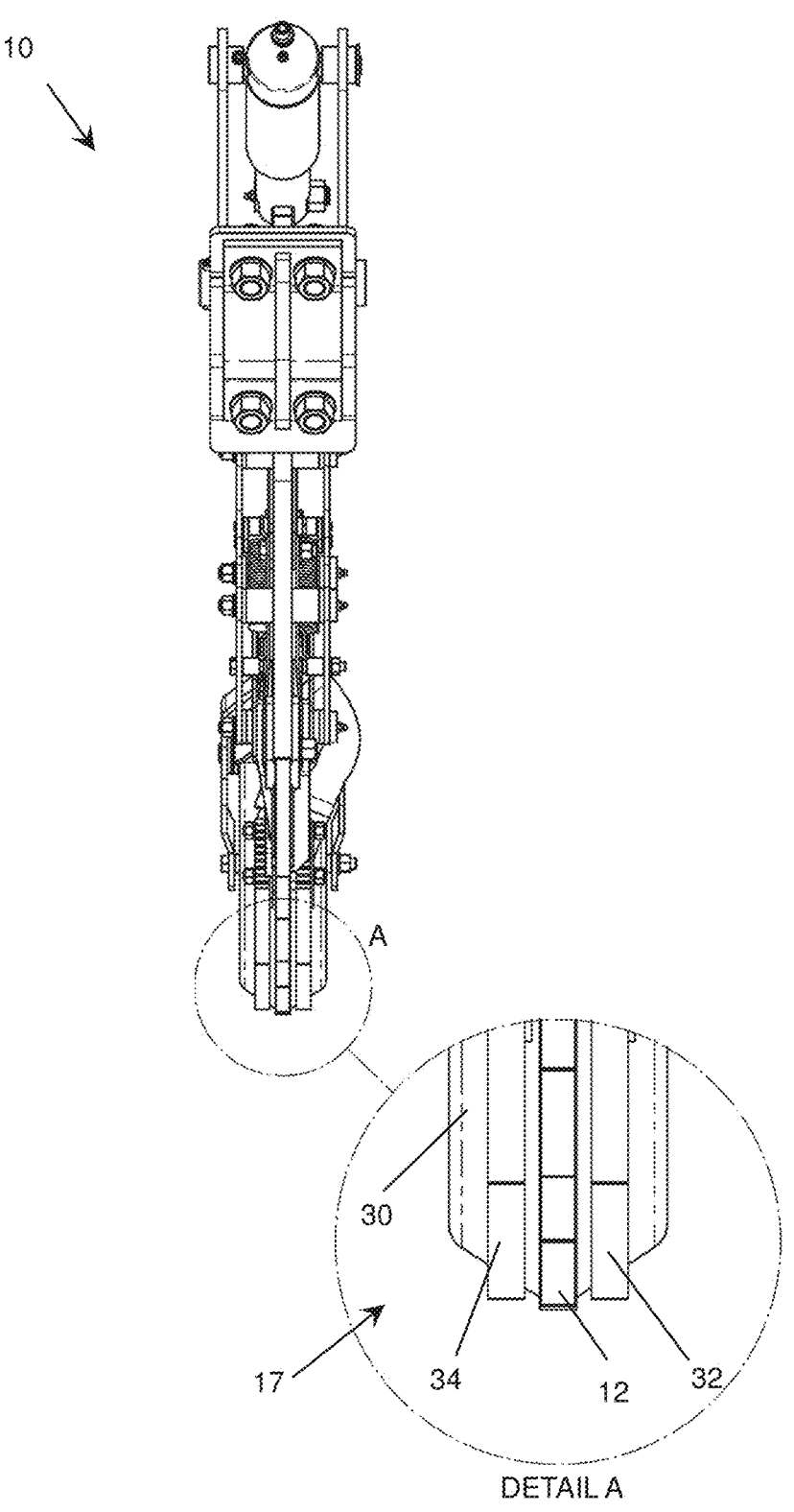
FIG. 2 is a front view of the cultivating apparatus of FIG. 1, illustrating an enlarged view of its soil working tools.

There is provided a seeding apparatus, earth working apparatus, or seeder and planter arrangement. The earth working apparatus may also be referred to as a cultivating apparatus, a seeder or a planter. A biasing mechanism or downward forcing mechanism may be provided having first and second arms to bias earth working tools, such as scrapers, seeding tips, blades or rollers of the earth working apparatus down into the ground by an urging force or downward force. The biasing mechanism may have at least a first arm which pivotally couples an operatively rear support structure or frame to an operatively forward support structure or frame. A tine may extend from the operatively forward support structure. The first arm or limb may include a plurality of adjustment notches, hooks, recesses or attachment points for adjusting the urging force of the biasing mechanism. The adjustment notches may, for example, be provided at an upper peripheral edge of the first limb.

The operatively rear support structure may have a first part having one or more soil working tools extending therefrom, and a second part pivotally connected to the first part. The second part may have a wheel or rolling device mounted thereto. The rolling device may be arranged to control a soil working depth of the one or more soil working tools. The rolling device may, for example, control a depth of one or more furrows created by the soil working apparatus. The first and second parts may be angularly adjustable and arranged to enable operative adjustment of an angle between the first and second parts. A toothed mechanism may couple the first and second parts to one another and the toothed mechanism may enable angular adjustment between the first and second parts to increase or decrease the operating or soil working depth of the soil working tools. A pivoting angle between the first and second parts may hence be adjustable. The toothed mechanism or a mechanism having a plurality of catches and a locking member or peg may be used to lock the first and second parts, so as to set the operating depth of the soil working tools.

Throughout the Figures, like features may be designated by like numerals.

Referring to FIGS. 1 to 4, there is shown a cultivating apparatus (10) in accordance with an exemplary embodiment of the present disclosure. The cultivating apparatus (10) includes a tine (12) that extends from a leading support frame (14). The tine may also be referred to as a prong or soil cutting blade. The leading support frame (14) is arranged to be towed or pushed by an agricultural vehicle (not shown). In embodiments of the present disclosure, the cultivating apparatus may also be in the form of a seeding apparatus, or a seeder and planter. However, it will be appreciated that embodiments may be possible in which soil working and seeding are performed by separate components.

In the present embodiment, the tine (12) is arranged to cut and loosen soil, and it may form a furrow in the soil in use. The apparatus (10) may further include a trailing support frame (16) having one or more soil working tools (17) extending therefrom. A biasing assembly (21) or downward forcing assembly is provided, and the assembly includes at least a first limb (18) which pivotally couples the trailing support frame (16) to the leading support frame (14) of the tine (12). A biasing spring (25) may be provided to urge the trailing support frame (16) and its soil working tools (17) downward with a biasing force or downward force. The biasing force (and corresponding spring size or quantity of spring(s)) may be designed or calculated so as to provide the necessary force for the particular application. The biasing spring may be a tension spring. The first limb (18) may include a plurality of hooks (22) whereto the biasing spring (25) is attachable or connectable. In the present embodiment, the hooks (22) are arranged for adjusting the biasing force of the biasing assembly (21). The hooks (22) may be shaped as adjustment notches provided at an upper peripheral edge of the first limb (18).

The biasing assembly (21) may optionally also include a second limb (20). The first and second limbs (18, 20) may collectively be arranged to pivotally couple the trailing support frame (16) to the leading support frame (14) of the tine (12). The first and second limbs (18, 20) may operatively form a biased quadrilateral mechanism, such as a biased parallelogram mechanism arranged to urge the trailing support frame (16) and its soil working tools (17) downward. The biasing assembly (21) may be attached or connected to the leading support frame (14), and to the trailing support frame (16) by way of a plurality of pivotal attachment points (31).

The biasing spring (25) of the biasing assembly (21) may extend from the first limb (18) to the second limb (20). It will be appreciated that, alternatively, the biasing spring may extend from the first limb to the leading support frame, or it may extend from the first limb to the trailing support frame (even though these alternatives are not shown in the drawings). In the present embodiment, an upper end of the biasing spring (25) may be attached, hooked or connected to one of the plurality of hooks (22) or adjustment notches. A lower end of the biasing spring (25) may be attached, hooked or connected to the second limb (20) of the biasing assembly. The biasing spring (25) may be operatively adjustable from one of the hooks (22) or adjustment notches to another one of the hooks (22) or adjustment notches at an upper periphery of the biasing assembly (21), so as to adjust the biasing force acting on the trailing support frame (16).

The one or more soil working tools (17) may include a first scraper (32) that extends from the trailing support frame (16). The first scraper (32) may be arranged to form a first bed in soil loosened by the tine (12). The one or more soil working tools (17) may further include a second scraper (34) extending from the trailing support frame (16). The first scraper (32) may be laterally offset on one operative side of the tine (12), while the second scraper (34) may be laterally offset on an opposite operative side of the tine (12). This is illustrated in more detail in the enlarged view of portion "A" in FIG. 2. The second scraper (34) may be arranged to form a second bed in soil loosened by the tine (12) in use. The first and second scrapers may also be referred to as trailing blades, or first and second seeding tips of the cultivating apparatus (10).

The one or more soil working tools (17) may also include a wheel (30) or roller mounted to the trailing support frame (16). The wheel may also be referred to as a compacting wheel. The wheel may be arranged so as to follow the first and/or second scrapers (32, 34) in use. The wheel (30) may be configured to act as a depth control wheel to control a working depth of the first and/or second scrapers (32, 34) in use. In the present embodiment, the biasing assembly (21) is configured to urge the wheel (30) downward by way of the biasing force or downward force.

Figure 3:
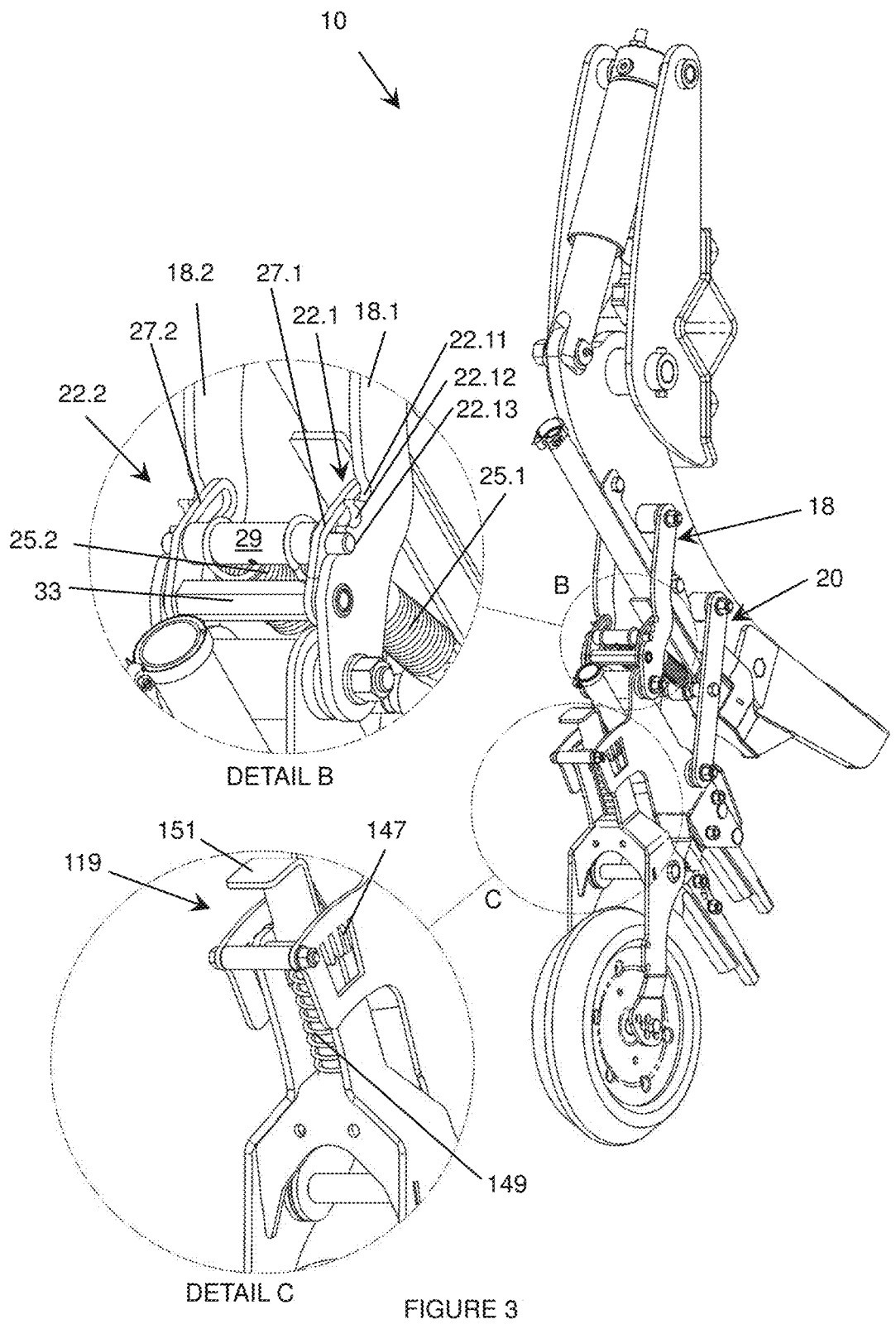
FIG. 3 is a three-dimensional view of the cultivating apparatus of FIG. 1 as viewed from a trailing end and above, illustrating enlarged views of some of its adjustable components.
Figure 4:
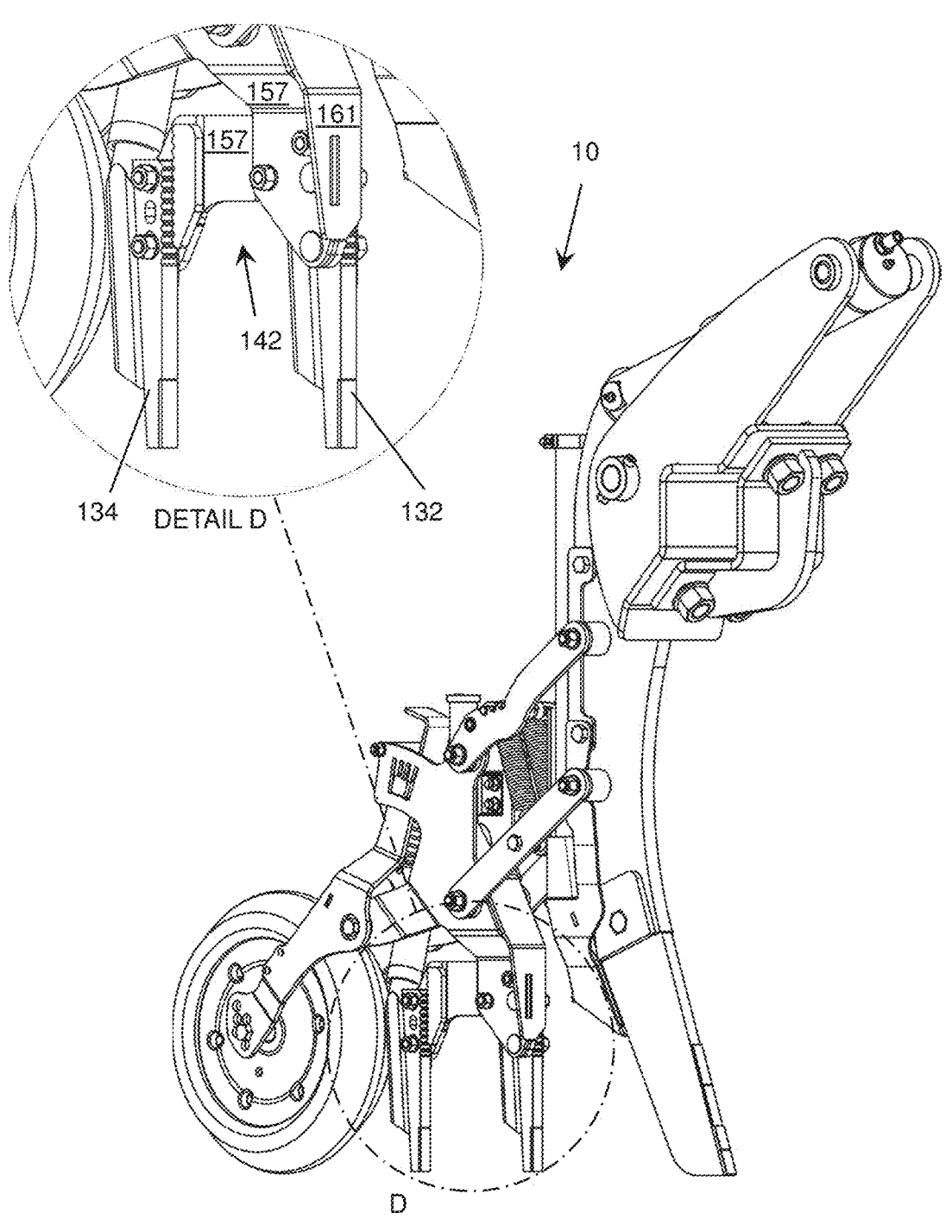
FIG. 4 is another three-dimensional view of the cultivating apparatus of FIG. 1 as viewed from a leading end, illustrating an enlarged view of first and second scrapers and first and second seeding tubes of the cultivating apparatus.

FIG. 3 shows more detail of the plurality of hooks (22) or adjustment notches. The hooks are preferably provided in or at an upper edge of the first limb (18). In the exemplary embodiment, the first limb (18) may include a first pair of structural members (18.1, 18.2) or plates as shown in the enlarged view of the portion designated "B" in FIG. 3. Each of the pair of structural members (18.1, 18.2) or plates may have a plurality of hooks (22.1, 22.2) at an upper peripheral edge thereof. The pair of plates or structural members (18.1, 18.2) may be similar to one another. Each plate may have any number of hooks thereon. In the present embodiment, each plate or structural member (18.1, 18.2) has first, second and third hooks (22.11, 22.12, 22.13) at its upper peripheral edge. Each of these hooks (22.11, 22.12, 22.13) may correspond to a different setting of the biasing assembly (21). For example, the hooks may correspond to different tension settings of springs (25.1, 25.2). In the present embodiment, the biasing spring (25) is in the form of a pair of biasing springs (25.1, 25.2) as can be seen in FIG. 3, but it will be appreciated that a single spring may also be used. Any number, or a plurality of biasing springs may be used.

The second limb (20) may include a second pair of structural members or plates in a similar way as the first limb (18), e.g., as is evident in FIG. 3. The second pair of structural members may also form part of the biased parallelogram mechanism or biasing assembly.

The hooks or adjustment notches (22.11, 22.12, 22.13) may facilitate easy adjustment of the biasing force of the biasing assembly (21). A rod (29) may be attached or connected to the spring(s) (25.1, 25.2) to hold the spring(s) under tension against the one or more hooks (22.11, 22.12, 22.13). In other words, the rod may connect the biasing spring to the one or more hooks or adjustment notches. A user may adjust the rod (29) from an operatively upper side of the biasing assembly (21), by hooking the rod into any one of the hooks. For example, the first hook (22.11) may correspond to a first and low biasing force, the second hook (22.12) may correspond to a second and intermediate biasing force, and the third hook (22.13) may correspond to a third and high biasing force. The biasing force may thus be increased or decreased by moving the rod (29) from one adjustment notch or hook to an adjacent adjustment hook or notch in the limb. The positioning of the hooks in the upper peripheral edge of the first limb (18) may facilitate easy adjustment in the field, because these hooks are easily accessible from a top or upper part of the biasing assembly. The first limb (18) may also have a curve or angle as shown in FIG. 1, in which one or more of the adjustment notches are in a curved or angled portion of the limb, so as to be closer to the lower end of the biasing spring in use, resulting in a lower biasing force. Of course, the limb may also be curved the other way around, to achieve a greater biasing force.

The rod (29) may have its ends fitted through slotted structures (27.1 27.2) that are rotatable about a shaft (33). The slotted structures (27.1, 27.2) may be arranged to enable sliding of the rod (29) with its biasing spring(s) (25.1, 25.2), so as to be aligned with one of the adjustment hooks before snapping into place to lock the biasing spring in the relevant biasing force setting of the selected hook. Rotation of the slotted structures against the bias of the tension springs (25.1, 25.2) may unlock the rod (29) from the relevant hook, to enable a user to adjust or move the rod to a different hook (22.11, 22.12, 22.13). The slotted structures and shaft (33) may also inhibit the biasing springs from becoming undone or from becoming loose (e.g., by inhibiting the rod from slipping between the pair of structural members (18.1, 18.1) when pulled against the biasing force by a user during adjustment). This may facilitate operation and adjustment of the biasing assembly (21) in use.

Figure 5:
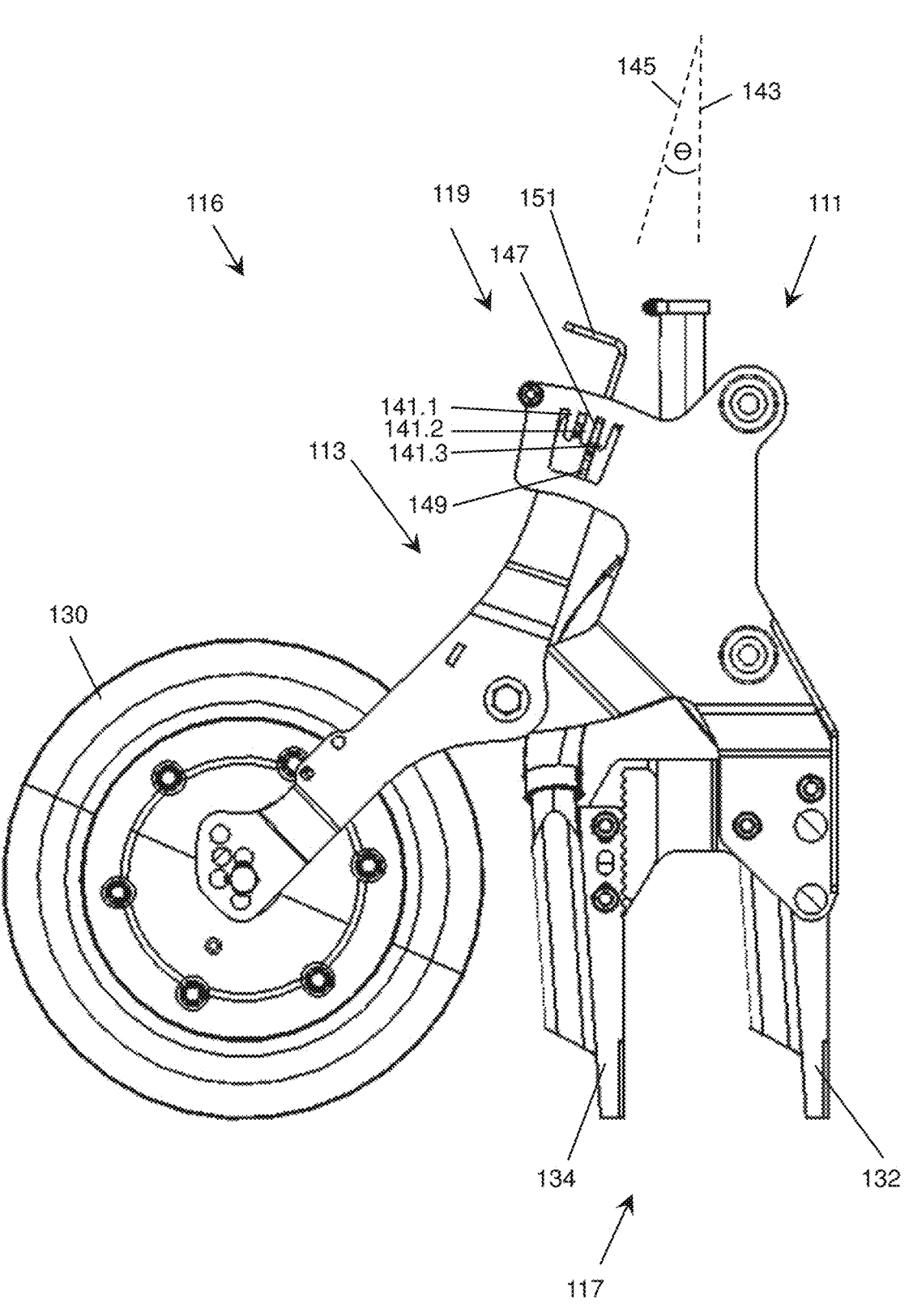
FIG. 5 is a side view of exemplary trailing components of the cultivating apparatus of FIG. 1, showing the first and second scrapers as well as a depth control wheel.

Turning now to FIG. 5, an exemplary embodiment of a trailing support frame (116) for a cultivating apparatus is shown. The trailing support frame (116) may form part of a cultivating apparatus (10) as shown in FIG. 1, and the trailing support frame (116) is shown in isolation in FIG. 5 to facilitate its explanation. It will be appreciated that features of the trailing support frame (16) of FIG. 1 may be equivalent to, or similar to the features of the trailing support frame (116) described with reference to FIG. 5. The trailing support frame (116) may be manufactured separately and may then, for example, be connected to the biasing assembly (21), and to the leading support frame (14). However, embodiments may be possible in which the trailing support frame is used on its own.

The trailing support frame (116) may include a first component (111) having one or more soil working tools (117) extending therefrom. The trailing support frame (116) may further include a second component (113) pivotally coupled to the first component (111). The second component (113) may have a depth control wheel (130) mounted thereto. The depth control wheel (130) may be arranged to control an operating depth of the one or more soil working tools (117) in use. Presently, the soil working tools are first and second scrapers (132, 134), similar to those described above.

In the present embodiment, an adjustable lock (119) is arranged to operatively adjust an angle (θ) between the first and second components (111, 113) and to lock the components so as to set the operating depth of the soil working tools (117). The angle (θ) may for example be measured between a major axis (143) of the first component (111) and a major axis (145) of the second component (113) of the trailing support frame (116).

The lock (119) may include one or more teeth (141.1, 141.2, 141.3) that are arranged to operatively adjust the angle (θ) between the first component (111) and the second component (113) so as to control the operating depth. The lock's teeth may operate to provide an adjusting mechanism to adjust the angle (θ), together with a locking peg (147) or selector which is described in more detail below.

The lock may also be referred to as a rack that has one or more teeth forming part of or fixed to the first component (111) of the trailing support frame (116). The lock (119) may include a biased peg (147) or selector attached or connected to the second component (113) of the trailing support frame (116). The peg (147) or selector is perhaps best shown in the enlarged view of a portion designated "C" in FIG. 3. The peg (147) or selector may be locked in place by a biasing spring (149) to a selected position in the rack or lock (119), such as between one or more of the teeth (141.1, 141.2, 141.3) of the rack. In the present embodiment the biasing spring (149) is in the form of a compression spring. It will be appreciated that the rack and peg or selector may also be reversed in position, so that the rack may be provided at the second component, whereas the peg or selector may be provided at the first component.

In use, an operator or user may use a handle (151) to move the peg or selector against the bias of the spring (149) and adjust it to snap into place at a different place between the teeth (141.1, 141.2, 141.3). This may facilitate a plurality of positions of the adjustable peg (147) or selector to be locked in place, thereby enabling a plurality of angles (e) to be set between the first and second components (111, 113). This may, in turn, enable different operating depths to be adjusted by changing the angle by way of adjustment of the adjustable lock (119). In other words, the operating depth of the soil working tools (132, 134) may be increased or decreased by adjusting the lock (119).

Figure 6:
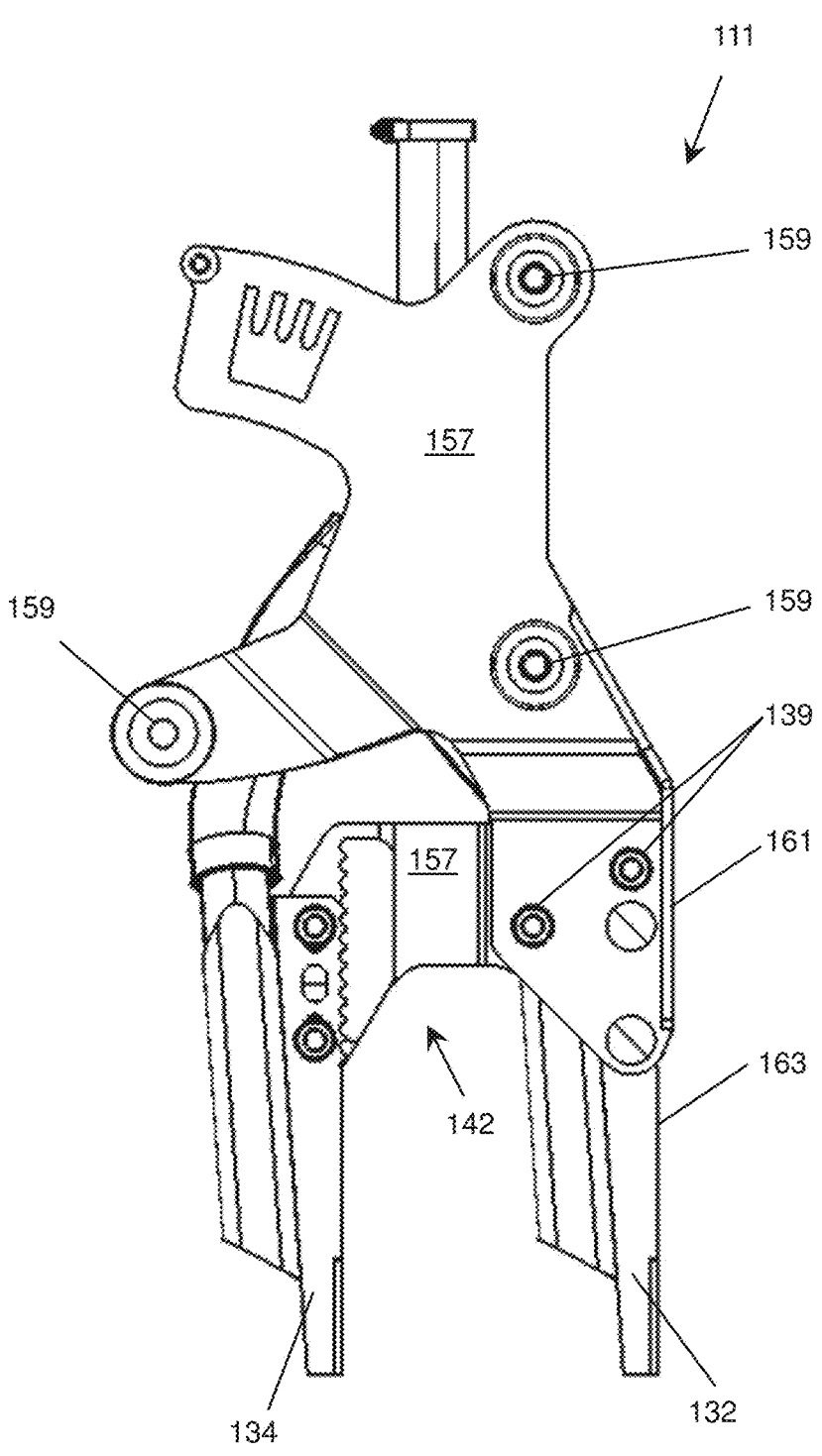
FIG. 6 is a side view of a component of the cultivating apparatus of FIG. 1 that has the first and second scrapers extending therefrom.

Turning now to FIG. 6, an exemplary embodiment of a component (111) for a cultivating apparatus is shown. The component (111) may form part of a cultivating apparatus (10) as shown in FIG. 1. In particular, the component (111) may form part of the trailing support frame (16) of FIG. 1. The component (111) is shown in isolation in FIG. 6 to facilitate its explanation. It will be appreciated that features of the component (111) of FIG. 6 may be equivalent to, or similar to some of the features of the trailing support frame (16, 116) described with reference to FIGS. 1 and 5. The component (111) may be manufactured separately and may then, for example, be connected to the biasing assembly (21), to the leading support frame (14), and to the second component (113) with its wheel (130).

In the present embodiment, the component (111) includes a body (157) having a plurality of pivotal attachment points (159) for attaching or connecting the body (157) to a depth control wheel component (113) (e.g., as shown in FIG. 5), as well as to a leading support frame (14) (e.g., as shown in FIG. 1). The body (157) may have a first scraper (132) or first seeding tip, and a second scraper (134) or second seeding tip extending from the body (157). It will be appreciated that the body may include one or more parts that are assembled to one another, e.g., by bolts and nuts (139) or other fasteners. The body (157) may form an arch shaped structure (142) between the first and second scrapers (132, 134). The body (157) may have a leading edge (161), and the leading edge (161) of the body (157) may be substantially flat when viewed from a lateral side thereof. The leading edge (161) of the body may also be substantially aligned with a leading edge (163) of the first scraper (132). The flat leading edge (161) of the body (157) and/or its substantial alignment with the leading edge of the scraper may provide the advantage that it may inhibit soil, clay, rocks, or other material from becoming lodged or stuck to the body (157) or to the first scraper (132). The profile or shape of the body (157) or its substantially flat leading edge profile may also inhibit the aforesaid material from becoming lodged or stuck between the component (111) and the leading support frame (14) (shown in FIG. 1).

The arch shaped structure (142) may be rounded or angled so as to form a recess or cavity between the first and second scrapers (132, 134) or seeding tips. The arch shaped structure (142) of the body (157) may be configured to inhibit soil, rocks, clay, or other material from becoming lodged or stuck between the first and second scrapers. The arch shaped structure (142) and leading edge (161) of the body (157) are perhaps best shown in the enlarged view of a portion marked "D" in FIG. 4.

Referring again to FIG. 1, a fertiliser tube (24) is shown joined to the leading support frame of the tine (12). The fertiliser tube may additionally, or in the alternative, include or be a seeding tube. The trailing support frame (16) may support a first seeding tube (26) and a second seeding tube (28). It will be appreciated that the seeding tubes may also be replaced with fertiliser tubes, or fertiliser tubes may be provided in conjunction with the seeding tubes. The first seeding tube (26) may have a first outlet opening (36) and the second seeding tube (28) may have a second outlet opening (38). The first and second seeding tubes (26, 28) may also be laterally offset on opposite sides of the tine, and each of the first and second seeding tubes (26, 28) may be positioned so as to be substantially aligned with a respective one of the first and second scrapers (32, 34). In use, the cultivating apparatus (10) may be moved in the direction of directional arrow (40) in FIG. 1.

In the present embodiment and in use, the tine (12) may rip or cut the soil to loosen a portion of the soil. Soil may then be loosened in a V-shape in cross-section. The natural flow characteristics of the soil may cause some of the displaced soil to fall back in behind the tine (12) while other soil is pushed onto the adjacent unloosened soil. The first seeding tube (26) may be aligned above one sloped side wall of the loosened soil so that its scraper (32) extends into the soil. The scraper (32) may open a smaller secondary furrow or seed bed into which seed exiting from the first outlet (36) can fall. Similarly, the second seeding tube (28) is aligned above the opposite sloped side wall of the loosened soil so that its scraper (34) extends into the soil. The scraper (34) opens a second smaller secondary furrow or seed bed into which seed exiting from the second outlet opening (38) can fall.

In soil having relatively high clay content, the tine (12) may sometimes form a deep gutter into which the soil does not flow back. In such a situation the scrapers (32, 34) may assist in collapsing the walls of the gutter while forming the secondary furrows so that the seed can be planted at a correct depth. This may facilitate seed germination, as it may inhibit seeds from falling to deeply into the deep gutter. A narrow shape of the scrapers (32, 34) may also cause the secondary furrows to be relatively narrow, consequently resulting in the soil flowing in behind the scrapers to close the secondary furrows once the seed has been deposited therein.

The wheel (30) may also assist in collapsing the walls of the secondary furrows, if necessary, and then press on the soil above the filled-in secondary furrows so that the soil firmly covers the seed. This may ensure that adequate ground contact is formed between the seed and the soil for proper germination of the seed. The compaction also assists in preventing the soil from being blown away in the wind and the seed from becoming exposed.

The operative height of the cultivating apparatus (10) may be adjusted by the passage of the wheel (30) over the surface of the soil. The wheel, being fixedly joined to the trailing support frame (16), may have the effect of raising or lowering the trailing support frame (16) as the wheel (30) travels along the ground. The wheel may thus act on the parallel mechanism or biasing assembly (21) against the downward force of the spring(s) (25). This may ensure that the seed is delivered to a desired depth irrespective of variations in the soil surface.

The use of the dual seeding tubes (26, 28) with a single tine (12) may allow a seeder or cultivating apparatus to have an increased spacing between neighbouring tines while still planting the same number of seed in seed rows. This may overcome a problem of soil being thrown over from one tine into the furrow formed behind an adjacent tine. The relatively close spacing between the secondary furrows may prevent wheat from falling in between the rows of stalks and it may alleviate resultant problems with harvesting windrow wheat.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and any accompanying claims, unless the context requires otherwise, the word 'comprise' or variations such as 'comprises' or 'comprising' will be understood to imply the inclusion of a stated integer or group of integers but not the exclusion of any other integer or group of integers.

What is claimed is:

1. A cultivating apparatus comprising:
a tine that extends from a leading support frame, the tine arranged to cut and loosen soil;
a trailing support frame having one or more soil working tools extending therefrom; and
a biasing assembly that includes at least a first limb which pivotally couples the trailing support frame to the leading support frame of the tine, and a biasing spring that urges the trailing support frame and its soil working tools downward by a biasing force, the first limb including a plurality of hooks whereto the biasing spring is connectable, the hooks arranged for adjusting the biasing force of the biasing assembly.

2. The cultivating apparatus as claimed in claim 1, wherein the hooks are shaped as adjustment notches provided at an upper peripheral edge of the first limb.

3. The cultivating apparatus as claimed in claim 1, wherein an upper end of the biasing spring is attached to one of the plurality of hooks of the first limb.

4. The cultivating apparatus as claimed in claim 1, wherein the biasing assembly includes a second limb, the first and second limbs collectively arranged to pivotally couple the trailing support frame to the leading support frame of the tine.

5. The cultivating apparatus as claimed in claim 4, wherein the biasing spring of the biasing assembly extends from the first limb to the second limb.

6. The cultivating apparatus as claimed in claim 5, wherein a lower end of the biasing spring is attached to the second limb of the biasing assembly, and wherein an upper end of the biasing spring is attached to one of the plurality of hooks of the first limb.

7. The cultivating apparatus as claimed in claim 1, wherein the biasing spring is operatively adjustable from one of the hooks to another one of the hooks of the first limb, so as to adjust the biasing force acting on the trailing support frame and its soil working tools.

8. The cultivating apparatus as claimed in claim 1, wherein the one or more soil working tools include one or more scrapers that extends from the trailing support frame, and wherein the one or more soil working tools further includes a wheel mounted to the trailing support frame, wherein the wheel is arranged to follow the one or more scrapers in use, the wheel acting as a depth control wheel to control a working depth of the one or more scrapers of the cultivating apparatus in use.

9. The cultivating apparatus as claimed in claim 8, wherein the biasing assembly is configured to urge the wheel and the one or more scrapers downward by way of the biasing force.

10. The cultivating apparatus as claimed in claim 1, wherein the biasing spring is a tension spring.

11. A trailing support frame for a cultivating apparatus as claimed in claim 1, the trailing support frame comprising:

a first component having the one or more soil working tools extending therefrom;

a second component pivotally coupled to the first component, the second component having a depth control wheel mounted thereto which is arranged to control an operating depth of the one or more soil working tools; and an adjustable lock arranged to operatively adjust an angle between the first and second components and to lock the components so as to set the operating depth of the soil working tools.

12. The trailing support frame as claimed in claim 11, wherein the lock includes one or more teeth that are arranged to operatively adjust the angle between the first component and the second component so as to control the operating depth.

13. The trailing support frame as claimed in claim 11, wherein the lock is a rack that has one or more teeth forming part of or fixed to the first component of the trailing support frame.

14. The trailing support frame as claimed in claim 13, wherein the lock includes a biased peg mounted to the second component of the trailing support frame, and wherein the biased peg is capable of being locked in place to a selected position in the rack, so as to provide a selected angle between the first and second components.

15. A component for a cultivating apparatus as claimed in claim 1, the component comprising a body having a plurality of pivotal attachment points for attaching the body to a depth control wheel component as well as to the leading support frame, the body having a first scraper and a second scraper extending therefrom, and the body forming an arch shaped structure between the first and second scrapers.

16. The component as claimed in claim 15, wherein the body has a leading edge which is substantially flat when viewed from a lateral side thereof.

17. The component as claimed in claim 15, wherein the arch shaped structure is rounded or angled so as to form a cavity between the first and second scrapers.

18. The component as claimed in claim 15, wherein the arch shaped structure is shaped and configured so as to inhibit soil, rocks, plant residue or other material from becoming lodged or stuck between the first and second scrapers.

* * * * *